No. 609,005. Patented Aug. 16, 1898.
J. W. BRAMWELL.
BICYCLE.
(Application filed Aug. 12, 1897.)

(No Model.)

WITNESSES
P. F. Eagle
L. Douville

INVENTOR.
Joseph W. Bramwell
BY Wiedersheim + Fairbanks
ATTORNEYS

UNITED STATES PATENT OFFICE.

JOSEPH W. BRAMWELL, OF PHILADELPHIA, PENNSYLVANIA.

BICYCLE.

SPECIFICATION forming part of Letters Patent No. 609,005, dated August 16, 1898.

Application filed August 12, 1897. Serial No. 647,947. (No model.)

*To all whom it may concern:*

Be it known that I, JOSEPH W. BRAMWELL, a citizen of the United States, residing in the city and county of Philadelphia, State of Pennsylvania, have invented a new and useful Improvement in Bicycles, &c., which improvement is fully set forth in the following specification and accompanying drawings.

My invention relates to improvements in bicycles and similar vehicles; and it consists in forming the fork of the front steering or leading wheel thereof in sections in such manner that should said wheel forcibly strike any object of any considerable size the fork will slip or yield, and thus avoid injury to the same and the adjacent parts of the bicycle or vehicle.

Figure 1:
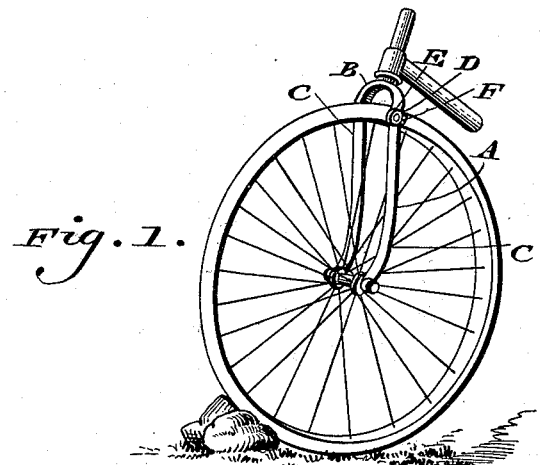
Figures 2, 3, 4:
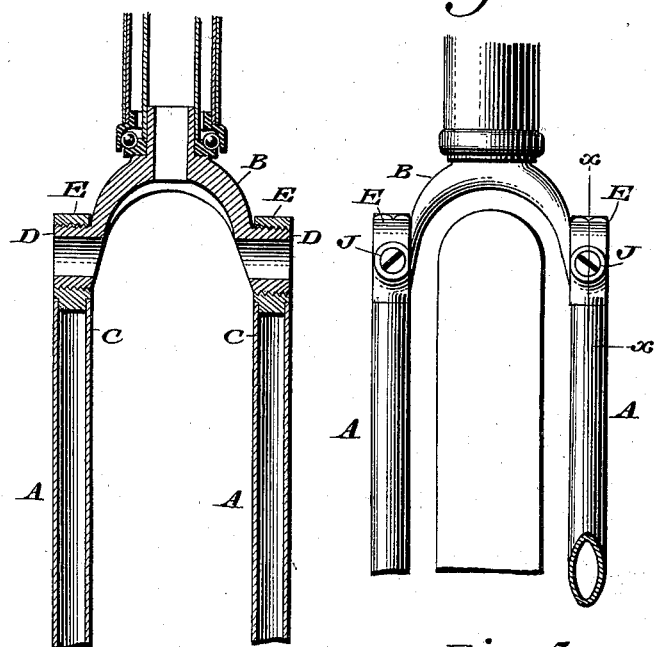
Figure 5:
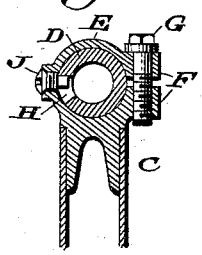

Figure 1 represents a perspective view of a portion of a bicycle embodying my invention. Fig. 2 represents a front view of a portion thereof, on an enlarged scale. Fig. 3 represents a vertical section thereof. Fig. 4 represents a side elevation thereof. Fig. 5 represents a vertical section of a portion on line *x x*, Fig. 2.

Similar letters of reference indicate corresponding parts in the figures.

Referring to the drawings, A designates a fork of a bicycle, the same being formed in sections, consisting of the crown or crosshead B and the legs or limbs C, to which the handle-bar rod is attached, on which the front wheel is mounted, said crown having on its lower ends the horizontally-arranged gudgeons D and said limbs having at their upper ends the vertically-arranged collars E, which latter are fitted on said gudgeons, the contiguous parts being screw-threaded, permitting the rotation of said collars on said gudgeons and forming slip-joints for the legs on the crown. The collars are split or divided and have on the ends of the divisions the eyes F, in which are received the screws or bolts G, which are adapted for closing the collars and clamping them on the gudgeons, thus preventing the slipping of the legs under ordinary circumstances. In the gudgeons D, in the circular direction of the same, are segmental slots H, into which project the inner ends of the studs J, whose main portions are fitted by screw-threads in the collars E opposite to the eyes F.

It will be seen that to all intents and purposes the limbs and the crown of the fork are connected as one, and the studs J abut against the upper walls of the slots H, as most plainly seen in Fig. 5.

In riding the bicycle the front wheel may strike small obstacles without affecting the adjustment of the limbs C; but should said wheel forcibly strike an obstacle of more than usual size or importance the limbs C, owing to the blows imparted to them, will turn or yield rearwardly, owing to the existing slip-joints, and thus there will be no material injury to the parts, the advantage of which is evident.

In the rearward motion of the limbs C the studs J are carried around with the collars E until they abut against the lower walls of the slots H, when they limit said rearward motion of the limbs.

When the screws or bolts G are properly turned, the split or divided collars E may expand and be released from their clamping action on the gudgeons D, after which the limbs may be restored to their normal position and said screws or bolts again tightened, and thus the limbs and crown are again connected, practically producing an integral fork, as before, the studs J abutting against the upper walls of the slots H and limiting the forward motion of the limbs and serving to set the latter in proper position.

If desired, the screw-threads on the gudgeons D and collars E may be omitted, while, however, preserving the slip-joints for the legs of the fork on the crown thereof.

Having thus described my invention, what I claim as new, and desire to secure by Letters Patent, is—

1. In a sectional fork, a crown with horizontally-arranged gudgeons thereon, limbs with vertically-arranged split collars thereon and screws respectively in the separate ends or eyes of said split collars.

2. In a sectional fork, a crown with horizontally-arranged gudgeons thereon, limbs with vertically-arranged split collars thereon and screws in the separate ends or eyes of said split collars, in combination with studs which are passed through said collars and freely enter segmental slots in said gudgeons.

JOSEPH W. BRAMWELL.

Witnesses:
JOHN A. WIEDERSHEIM,
A. P. JENNINGS.